Figure 2:
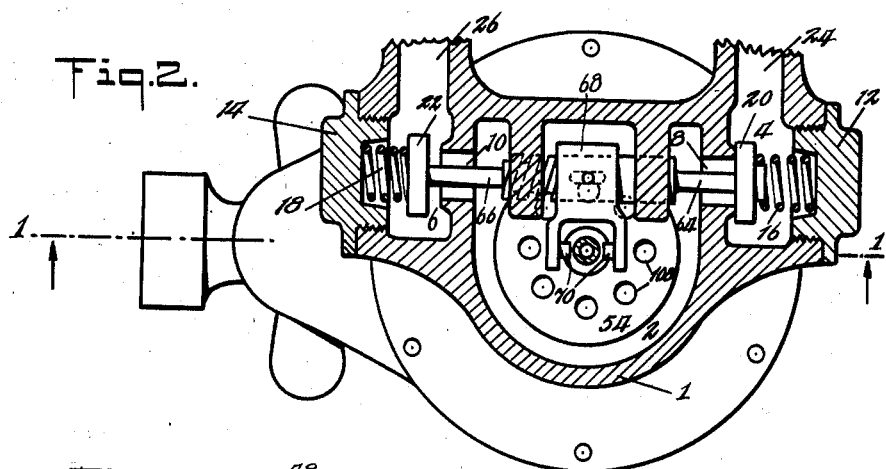

Jan. 19, 1932.  M. E. CARTIER  1,842,358

THERMOSTATIC MIXING VALVE

Filed Feb. 2, 1931

INVENTOR
MARCEL E. CARTIER
by his attorneys
Howson and Howson

Patented Jan. 19, 1932

1,842,358

UNITED STATES PATENT OFFICE

MARCEL E. CARTIER, OF NEW YORK, N. Y.

THERMOSTATIC MIXING VALVE

Application filed February 2, 1931. Serial No. 512,995.

This invention relates to valve mechanisms designed to mix supplies of hot and cold water to provide a discharge of water of a desired temperature and more particularly to valve mechanism of the type described in which a thermostat is incorporated to maintain the water furnished at a desired temperature, and it is an object of this invention to provide a valve of the type described in which there are means to regulate the discharge so as to prevent variations in the temperature thereof when the pressure of one of the supplies falls suddenly as when water is drawn somewhere else. It is also an object of this invention to provide means responsive to the pressure of the supply in a valve of the type described which will cooperate with the thermostat in maintaining a discharge of water of uniform temperature. It is also an object of this invention to provide means responsive to the supply pressure in a valve of the type described which will cooperate with the thermostat in controlling the valve operating means to provide a discharge of water of uniform temperature, and it is also an object of this invention to provide in a valve mechanism of the type described an improved valve operating means and connections therefrom to the thermostat control and to the means responsive to the supply pressure.

In the drawings—

Figure 1:
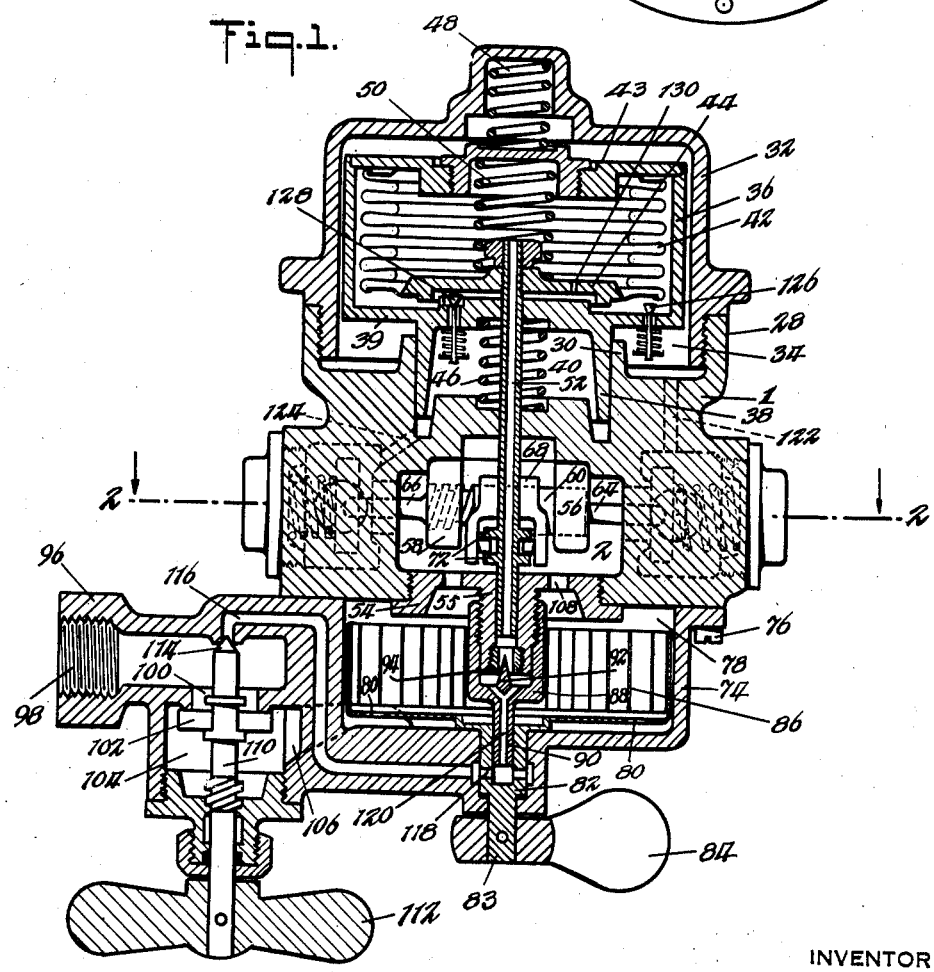

Figure 1 is substantially a vertical section taken as on the line 1—1 of Fig. 2 of a mixing valve mechanism constructed in accordance with this invention; and Figure 2 is a horizontal section taken as on the line 2—2 of Fig. 1.

As shown in the drawings a valve mechanism constructed in accordance with this invention comprises a main body portion 1 shown as a casting recessed to form a chamber 2 disposed between chambers 4 and 6 which communicate with the chamber 2 through the ports 8 and 10 respectively. Each of the chambers 2, 4 and 6 is open to a face of the body portion 1 and the openings are threaded to receive plugs. Plugs 12 and 14 which close the openings to the chambers 4 and 6 are recessed to form seats for springs 16 and 18 which bias valves 20 and 22, respectively, to their seats. The valves 20 and 22 control the ports 8 and 10 and the flow from the inlets or supply connections 24 and 26, respectively, and the valve chambers 4 and 6. One face of the body portion 1 is provided with spaced circular flanges 28 and 30, the outer one of which is interiorly threaded to receive a cap 32 which, with the body portion 1, forms a chamber 34.

The body portion 1 is recessed within the circular flange 30 and mounted in the chamber 34 is a hollow cylindrical piston 36 having a circular flange 38 which engages the inner surface of the flange 30.

The portion of the inner face 39 of the piston 36 which lies within the circular flange 38 forms with the flange 38 and the body portion 1 a chamber 40. Mounted within the hollow piston 36 is a collapsible bellows 42 attached to the outer portion 43 of the hollow piston 36 and having a rigid plate-like or piston portion 44 spaced therefrom. Springs 46 and 48 normally hold the hollow piston 36 centered or in the position shown in Fig. 1 while spring 50 normally holds the bellows extended with the piston portion 44 adjacent the inner portion 39 of the hollow piston 36. To the piston portion 44 is attached a hollow operating rod or tube 52 which projects through an opening in the body portion 1, through the chamber 2 thereof and through an opening in the plug 54 which closes the opening from chamber 2 to a face of the body portion 1. The center portion of the plug 54 is shaped to provide an outwardly extending boss 55 which is bored to slidably receive and guide the end of the hollow rod 52.

Formed integrally with the body portion 1 are lugs 56 and 58 which project into the chamber 2 and are provided with openings, the opening in the lug 58 being threaded to receive a rotatable operating rod or stem 60. The rod 60 is threaded so as to fit the threaded opening in the lug 58, is slidably mounted in the opening in the lug 56 and has reduced portions 64 and 66 at the ends thereof which engage with the valves 20 and 22 respectively. Mounted on the rod 60 is an arm 68 having an opening in which the rod 60 may travel but so connected with the rod that the rod 60 will rotate with the movements of the arm 68. Rotation of the rod 60 causes it to move longitudinally. The outer end of the arm 68 is forked and provided with inwardly projecting lugs 70 which engage between annular shoulders 72 formed on the hollow rod 52.

To a face of the body portion 1 is attached a hollow cap 74 as by screws 76 which hollow cap forms with the body portion 1 a chamber 78 in which is mounted a perforated cup 80 having an axial projection 82 with a reduced portion 83 which extends through an opening formed in the cap 74 and serves as a stem for the attachment of a handle 84. To the cup 80 is attached the outer end of a spiral thermostat 86 the inner end of which is attached to a cap 88 threaded on the boss 55 of the plug 54. The cap 88 has an axial projection 90 which rotatably fits a bore in the axial projection 82 of the cup 80 and has a bore 120 extending throughout its length and communicating with the interior of the cap 88. Formed at the inner end of the bore 120 is a conical valve 92 which engages with a bushing or valve seat 94 in an enlargement in the bore in the boss 55 of the plug 54. The cap 74 is provided with a projection 96 having a passage 98 which serves as a discharge outlet and which is connected through a port 100 controlled by a valve 102 with a chamber 104. The chamber 104 is connected through passage 106 with the chamber 78 and the chamber 78 is connected through ports 108 in the plug 54 with the chamber 2. The valve 102 is controlled by the valve stem 110 having a handle 112 thereon. The stem 110 projects beyond the valve 102 and is tapered at its end to form a valve 114 which controls a passage 116 connected through ports 118 in the extension 82 of the cup 80 with the bore 120 in the extension 90 of the cap 88. Passages 122 and 124 connect the valve chambers 4 and 6 with chambers 34 and 40 respectively, and check valves 126 and 128 control passages from chambers 34 and 40, respectively, to the interior of the hollow piston 36. A small port 130 establishes communication from the interior of the hollow piston 36 to the interior of the bellows 42.

In service the valve is connected to the usual hot and cold water supplies, the hot water supply being connected to inlet 24 and the cold water supply to inlet 26. As shown in the drawings, the valve 22 is normally held open by the rod 60 and cold water passes from chamber 6 through port 10 to the chamber 2, then through ports 108 into chamber 78 and through passage 106 to chamber 104 where the flow is arrested by the valve 102. The cold water also passes from chamber 6 through passage 124 to chamber 40 and past check valve 128 to the interior of the hollow piston 36. The hot water passes from the chamber 4 through passage 122 to the chamber 34. From the chamber 34 the hot water passes check valve 126 to the interior of the hollow piston 36. From the interior of the hollow piston 36 water passes through the passage 130 to the interior of the bellows 42 and from there through the hollow rod 52 past the valve 92 and through the bore 120, ports 118 and passage 116 to the valve 114 where the flow is arrested. From the arrangement described it will be apparent that the hollow piston 36 is subjected to an unbalanced pressure from the hot water supply in a direction to move the hollow piston towards the valve body 1 and to the pressure from the cold water supply fed to chamber 40 where it acts upon a portion of the hollow piston 36 in opposition to the unbalanced pressure from the hot water supply. When the supply pressures are balanced the pressures on the piston balance.

It will also be apparent that the piston portion 44 of the callapsible bellows 42 is normally subjected to balanced fluid pressures and upon the opening of the valve 114 the fluid pressure will be vented from the interior of the callapsible bellows through the hollow rod 52 past the needle valve 92 and through bore 90, ports 118 and passage 116. It will also be apparent that the thermostat 86 is subjected to the fluid discharged from the mixing chamber 2 so that it will be operated in accordance with variations in the temperature of the fluid flowing from the mixing chamber 2 and will turn cap 88 to advance or retract valve 92 to control the port in the extension 55 of the plug 54 and in this way control equalization of pressures on opposite sides of the piston portion 44 of the bellows 42.

In operation when the valve 102 is opened to discharge water the valve 114 is opened simultaneously so that as the water flows from the mixing chamber 2 past the thermostat 86 to the discharge outlet, water also flows from the interior of the collapsible bellows 42 through the hollow rod 52 and bore 120, ports 118 and passage 116 permitting the pressure in the interior of the hollow piston 36 to collapse the bellows 42 and shift the piston portion 44 thereof towards the outer portion 43 of the hollow piston 36. The port 130 is of much less capacity than the hollow rod 52 so that the water is discharged from the interior of the bellows 42 sufficiently rapid to permit the pressure without the bellows to overcome the resistance of the spring 50. As the bellows 42 is collapsed the hollow rod 52 is operated moving the arm 68 and rotating the rod 60 a part of a turn. As the rod 60 is rotated the threaded portion of the rod shifts the rod in the lugs 58 and 56 to the right as seen in Fig. 1, causing the valve 20 controlling the hot water supply to be opened and the valve 22 controlling the cold water supply to be closed partially, thus raising the temperature of the water supplied from the mixing chamber 2 past the thermostat 86 to the discharge outlet. The temperature of the water supplied will be raised until it attains a sufficient degree of temperature to cause the thermostat 86 to operate the cap 88 to bring the valve 92 to a position closing or partially closing the port in the extension 55 of the plug 54. With the closing or partial closing of the port by the valve 92 the flow of liquid through the passage 130 will tend to fill the collapsed bellows 42 and equalize the pressures on opposite sides of the piston portion 44 permitting the spring 50 to return the piston portion 44 and hollow rod 52 towards their normal positions and operate the valves 20 and 22. The thermostat will, of course, respond to any variation in the temperature of the water flowing from the mixing chamber 2 and will regulate the opening controlled by the valve 92 accordingly so that the temperature of the water flowing past the thermostat 86 will be maintained substantially at the temperature for which the thermostat has been set by the manipulation of the handle 84.

If, while the fluid is flowing from the mixing chamber 2 water is drawn elsewhere on the premises reducing the pressure of either the hot or cold water supply it will be noted that the pressure acting upon the hollow piston 36 will be varied in accordance therewith and that the unbalanced fluid pressure will shift the hollow piston 36 carrying with it the collapsible bellows 42 and the hollow rod 52 in accordance with the movement of the hollow piston 36. It will be noted that the arrangement is such that should the pressure fall in either the hot or cold water supply that the movement of the hollow piston 36 is such as to tend to open further the valve controlling the supply in which the pressure has been reduced.

When the flow of water is cut off by the valve 102, valve 114 will be seated stopping the flow from the interior of the collapsible bellows 42 whereupon the bellows 42 will be filled and the piston portion 44 returned to a position as shown in Figure 1 by the action of the spring 50. This movement of the piston portion 44 will return the hollow rod 52 and rod 60 to their normal positions permitting the valve 20 to close and restoring valve 22 to the normal open position shown. As the water retained in the mixing chamber 2 and chamber 78 cools the thermostat 86 will be operated shifting valve 92 in accordance therewith.

While the structure shown and described is the best arrangement now known for carrying out this invention, the invention is not, however, to be limited to the exact arrangement shown and described as various changes in detail and general arrangement may be made without departing from the spirit and scope of the invention as defined in the accompanying claims.

I claim—

1. In a mixing valve structure, a plurality of valves supplying water from separate supplies to a mixing chamber, an actuator for said valves, means subjected to the opposing pressures of the supplies to said valves for operating said actuator.

2. In a mixing valve structure, a plurality of valves supplying water from separate supplies to a mixing chamber, an actuator for said valves, means normally subjected to balanced fluid pressures for operating said actuator and means controlling the discharge from said mixing chamber adapted to unbalance the pressures of said first mentioned means.

3. In a mixing valve structure, a plurality of valves supplying water from separate supplies to a mixing chamber, means normally subjected to balanced fluid pressures for operating said valves, a valve for controlling the discharge from one side of said means, a second valve for controlling the discharge from said means and a thermostat responsive to variations in the temperature of the discharge from said mixing chamber for controlling said second valve.

4. In a mixing valve structure, a plurality of valves supplying water from separate supplies to a mixing chamber, an actuator for said valves, means responsive to variations in the pressures of the supplies to said valves for operating said actuator, means normally subjected to balanced fluid pressures for operating said actuator and means for controlling the discharge from said mixing chamber adapted to unbalance the pressures on said second mentioned means.

5. In a mixing valve structure, a plurality of valves supplying water from separate supplies to a mixing chamber, an actuator for said valves, means normally subjected to balanced fluid pressures for operating said actuator, means controlling the discharge from said mixing chamber adapted to unbalance the pressures on said first mentioned means and a thermostatically operated valve for controlling the reestablishing of balanced pressures on said first mentioned means.

6. In a mixing valve structure, a plurality of valves controlling separate supplies of fluid to a mixing chamber and means subjected to the opposing pressures of the supplies to said valves for operating said valves.

7. In a mixing valve structure, a plurality of valves controlling separate supplies of fluid to a mixing chamber, an actuator common to both of said valves and means responsive to variations in the pressures of said supplies to operate said actuator.

8. In a mixing valve structure, a plurality of valves controlling separate supplies of fluid to a mixing chamber, means interposed between said valves permitting one valve to close while opening the other and a piston subjected on opposite sides to the pressures of said supplies for operating said means.

9. In a mixing valve structure, a plurality of valves controlling separate supplies of fluid to a mixing chamber, means interposed between said valves for reversely operating said valves and a piston subjected to the opposed pressures of said supplies for operating said means.

10. In a mixing valve structure, a plurality of valves controlling separate supplies of fluid to a mixing chamber, an actuator common to both of said valves, means normally subjected to balanced fluid pressures operatively connected to said actuator, means for unbalancing said pressures and temperature responsive means for controlling the balancing of said fluid pressures.

11. In a mixing valve structure, a plurality of valves controlling separate supplies of fluid to a mixing chamber, means interposed between said valves for reversely operating said valves, means normally subjected to balanced fluid pressures operatively connected to said valve operating means, a valve operative to unbalance the fluid pressures on said second means upon the discharge of fluid from said mixing chamber, a second valve operative to control the balancing of said fluid pressures and means responsive to variations in the temperature of the fluid discharged from said mixing chamber for operating said second valve.

12. In a mixing valve structure a plurality of valves controlling separate supplies of fluid to a mixing chamber, means normally subjected to balanced fluid pressures for operating said valves and means subjected to the opposed pressures of said supplies and adapted to shift said first means to operate said valves.

13. In a mixing valve structure, a plurality of valves controlling separate supplies of fluid to a mixing chamber, a piston subjected to the opposed pressures of said supplies for operating said valves and means normally subjected to balanced fluid pressures and carried by said piston for also operating said valves.

14. In a mixing valves structure, a plurality of valves controlling separate supplies of fluid to a mixing chamber, a collapsible bellows for operating said valves and a piston subjected to the opposed pressures of said supplies to shift said bellows to operate said valves.

15. In a mixing valve structure, a plurality of valves controlling separate supplies of fluid to a mixing chamber, a hollow piston subjected to opposed pressures of said supplies, a collapsible bellows mounted within said piston and operatively connected to said valves, means for collapsing said bellows to operate said valves and a thermostatically operated valve for controlling the expanding of said bellows, said piston shifting said bellows in response to unbalancing of said supply pressures to operate said valves.

16. In a mixing valve structure, a plurality of valves controlling separate supplies of fluid to a mixing chamber, a hollow piston subjected to opposed pressures of said supplies, a collapsible bellows mounted within said piston and operatively connected to said valves, means for collapsing said bellows to operate said valves, a valve controlling the expansion of said bellows and a thermostat responsive to variation in the temperature of the fluid discharge from the mixing chamber for operating said bellows controlling valve, said piston shifting said bellows in response to unbalancing of said supply pressures to operate said valves.

17. In a mixing valve structure having valves controlling the supply of fluid from separate supplies to a mixing chamber, thermostatically controlled means and a piston responsive to variations in the pressures of the separate supplies cooperating to control said valves.

18. In a mixing valve structure having valves controlling the supply of fluid from separate supplies to a mixing chamber, thermostatically controlled means responsive to variations in the temperature of the fluid flowing from said mixing chamber and a piston responsive to variations in the pressures of the separate supplies cooperating to control said valves.

19. In a mixing valve structure having valves controlling the supply of fluid from separate supplies to a mixing chamber, thermostatically controlled means responsive to variations in the temperature of the fluid flowing from said mixing chamber and a piston responsive to variations in the pressures of the separate supplies, each of said means being operative to modify the effect of the other of said means in the controlling of said valves.

In testimony whereof I have signed my name to this specification.

MARCEL E. CARTIER.